US011392472B2

(12) United States Patent
Sayles et al.

(10) Patent No.: US 11,392,472 B2
(45) Date of Patent: Jul. 19, 2022

(54) MODULAR DATA CENTER TESTING

(71) Applicant: DELL PRODUCTS, L.P., Round Rock, TX (US)

(72) Inventors: Jeffery T. Sayles, San Marcos, CA (US); Mario E. Salazar Granados, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 444 days.

(21) Appl. No.: 16/686,082

(22) Filed: Nov. 15, 2019

(65) Prior Publication Data

US 2021/0149780 A1 May 20, 2021

(51) Int. Cl.
*G06F 11/26* (2006.01)
*G06F 13/40* (2006.01)
*G05B 19/042* (2006.01)
*G06F 11/22* (2006.01)
*G06F 1/22* (2006.01)

(52) U.S. Cl.
CPC ........... *G06F 11/26* (2013.01); *G05B 19/042* (2013.01); *G06F 11/22* (2013.01); *G06F 13/4081* (2013.01); *G05B 2219/2614* (2013.01)

(58) Field of Classification Search
CPC ...... G06F 11/26; G06F 11/22; G06F 13/4081; G05B 19/42; G05B 2219/2614
See application file for complete search history.

(56) References Cited

U.S. PATENT DOCUMENTS

| 5,541,862 | A  | * | 7/1996 | Bright | ............... G06F 9/455 702/123 |
|---|---|---|---|---|---|
| 8,743,543 | B2 |   | 6/2014 | Clidaras et al. | |
| 9,565,783 | B1 | * | 2/2017 | Whitted | ............... G06F 1/16 |
| 9,665,464 | B2 |   | 5/2017 | Ziegler et al. | |
| 10,009,232 | B2 | * | 6/2018 | Duncan | ............. H04L 43/0817 |
| 2005/0107976 | A1 | * | 5/2005 | Klijn | ............... G01R 31/3272 702/118 |
| 2008/0016493 | A1 | * | 1/2008 | Pouchak | ............ G05B 19/0426 717/109 |

(Continued)

FOREIGN PATENT DOCUMENTS

WO WO-2012033484 A1 * 3/2012 ......... G01R 31/2834

*Primary Examiner* — Matthew M Kim
*Assistant Examiner* — Indranil Chowdhury
(74) *Attorney, Agent, or Firm* — Isidore PLLC

(57) ABSTRACT

A test controller functionally tests components of a modular data center (MDC) that is being manufactured. Functional test(s) for quality assurance of an environmental control system (ECS) are determined for an information technology pre-assembled component (ITPAC) module and an environmental system (ES) module that are configured for being coupled together for cooling of heat-generating equipment of the ITPAC module at a deployed location. For each functional test(s), the test controller identifies input signal value(s) associated with one of the modules. The test controller emulates, via a communication test cable connected between the one module and the test controller, the identified input signal value(s). The test controller determines, via the communication test cable, any response by the one module to the input signal value(s). The test controller compares the determined response to an expected response and generates and outputs test data based on the comparison.

19 Claims, 14 Drawing Sheets

(56) References Cited

U.S. PATENT DOCUMENTS

| | | | |
|---|---|---|---|
| 2012/0200992 A1 | 8/2012 | Schmitt et al. | |
| 2012/0319838 A1* | 12/2012 | Ly | H04L 67/12 |
| | | | 702/188 |
| 2015/0094986 A1* | 4/2015 | Daddis, Jr. | G01M 99/005 |
| | | | 702/183 |
| 2016/0259700 A1* | 9/2016 | Volkmann | G06F 11/273 |
| 2016/0378314 A1* | 12/2016 | Duncan | H04L 67/125 |
| | | | 715/736 |
| 2017/0115658 A1* | 4/2017 | Colt, Jr. | G05B 19/41875 |
| 2017/0315215 A1* | 11/2017 | Berezin | G01S 13/87 |
| 2018/0089045 A1* | 3/2018 | Weksler | G06F 11/2268 |
| 2018/0252593 A1* | 9/2018 | Kutty | H05K 7/20836 |
| 2020/0317445 A1* | 10/2020 | Schultz | G07F 9/105 |

\* cited by examiner

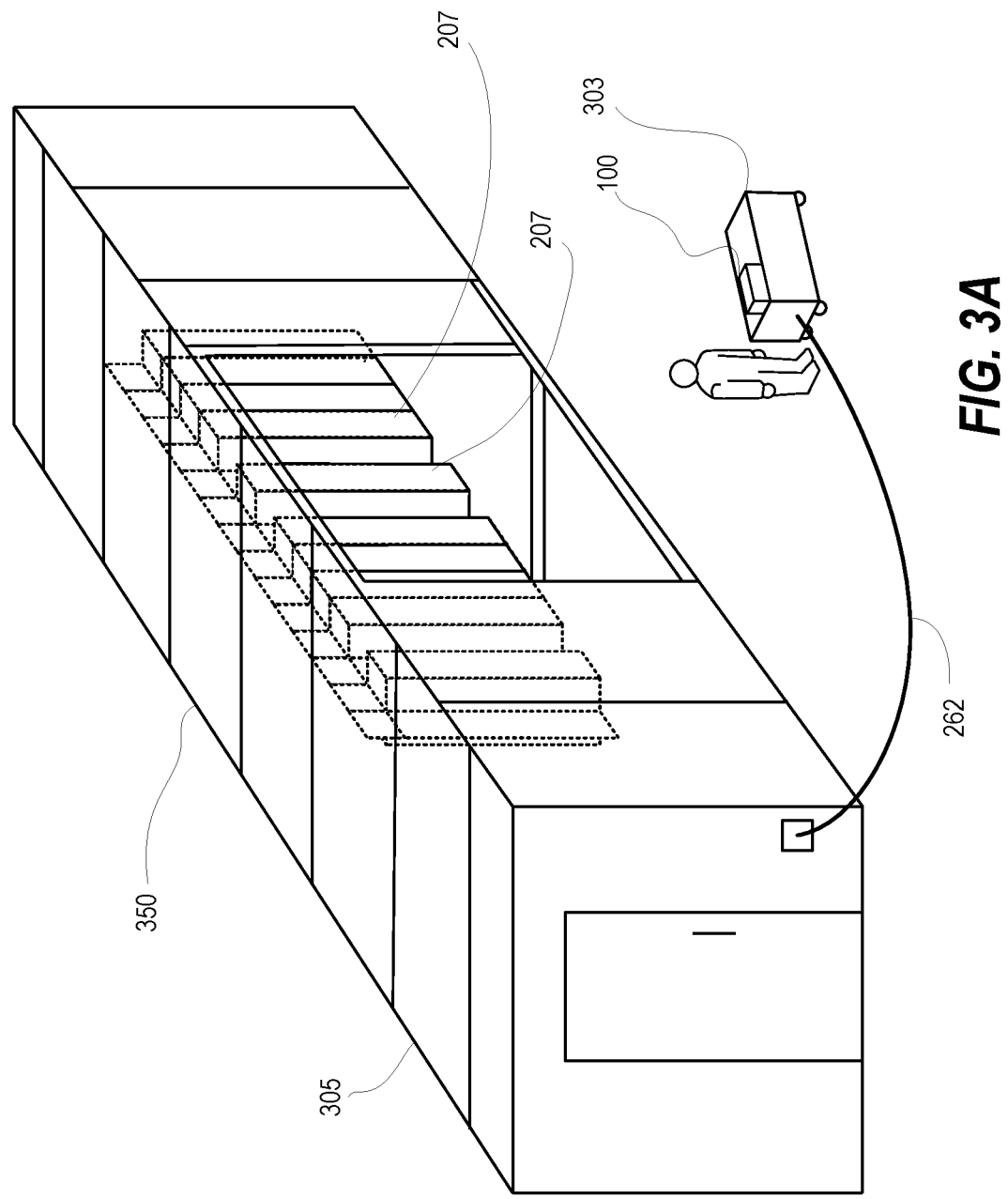

MODULAR DATA CENTER TESTING

BACKGROUND

1. Technical Field

The present disclosure generally relates to test systems that test information handling systems and in particular to test systems that test individual modular components of a modular data center.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A modular data center (MDC) contains data center equipment such as information handling systems, data storage, and networking equipment that are typically housed in a container, which is transported to a desired location. MDCs that are composed of smaller subsection modules are manufactured in single smaller sections for the ease of construction and for shipping to the production site or installation site. Testing and validation at the time of manufacturing is not possible prior to assembling all the single smaller sections into a completed system. Some subsections, such as modules containing information technology equipment, require a more lengthy manufacture and assembly at more than one production site, which makes testing at the factory not practical. In addition, the smaller subsection modules are not manufactured at the same time, further making testing impossible during the manufacturing process. Without the ability to perform a functional systems test and validation at the manufacturing site, system defects are discovered at first startup of the assembled MDC. Significant programmatic delays can occur in correcting such system defects at the deployed site. The time required to get replacement equipment and technicians to the site causes a direct delay in planned operation of the MDC.

BRIEF SUMMARY

Disclosed are an information handling system (IHS), a method for functionally testing components of a modular data center (MDC) that is being manufactured, and a method for testing and separately deploying components of an MDC.

According to one embodiment, an IHS includes a memory containing a test application that defines functional tests for quality assurance of an environmental control system (ECS). The ECS is distributed between an information technology pre-assembled component (ITPAC) module and an environmental system (ES) module. The functional tests are performable during separate assembly of the ITPAC and the ES module. The ITPAC and the ES modules are configured for being coupled together for cooling of heat-generating equipment of the ITPAC module at a deployed location, with the assembly enabling operational use as a modular data center (MDC). The ECS is managed by an ECS controller positioned in at least one of the ITPAC and the ES modules. The ECS controller is responsive to sensor inputs to determine environmental requirements of the ITPAC module to select an environmental operating mode of the ES module. A communication test cable of the IHS is connectable between the ITPAC module and the ES module to carry sensor and control signals for operation of the ECS. A test controller of the IHS is communicatively coupled to the memory. The test controller is also communicatively coupled via the communication test cable to a selected module from among the ITPAC module and the ES module. The test controller is communicatively coupled with the ECS controller of the selected module. The test controller substitutes for the other module that is not being tested. The test controller executes the test application which, in response to a trigger to test the selected module, enables the controller to provide functionality to determine one or more functional tests that are specified for the selected module. For each of the one or more functional tests, the test controller identifies at least one input signal value that originates from the other module that the test controller has to emulate. The test controller emulates, via the communication test cable, the identified at least one input signal value. The test controller detects, via the communication test cable, any response by the selected module to the at least one input signal value. The test controller compares the detected response to an expected response contained in the test application. The test controller generates and outputs test data based on the comparison.

According to a next embodiment, a method is provided for functionally testing components of an MDC that is being manufactured. The method includes determining one or more functional tests for quality assurance of an ECS, the functional tests being specified for a selected module from among an ITPAC module and an ES module. The ITPAC module and an ES module are configured for being coupled together for cooling of heat-generating equipment of the ITPAC module at a deployed location, where the assembly is provided for operational use as an MDC. For each of the one or more functional tests, the method includes identifying, by a test controller, at least one input signal value associated with the other module. The method includes emulating, via a communication test cable connected between the selected module and the test controller, the identified at least one input signal value. The method includes determining, via the communication test cable, any response by the selected module to the at least one input signal value. The method includes comparing the determined response to an expected response contained in the test application. The method includes generating and outputting test data based on the comparison.

According to another embodiment, a method is provided for separately testing and separately deploying components of an MDC. The method includes providing a volumetric container of an ITPAC module that has mounting provisions for heat-generating equipment. The heat-generating equipment require cooling air by an ES module that is physically and electrically coupled to the ITPAC module at a deployed location. The method includes installing, in the ITPAC module, a portion of an ECS that provides the cooling for the heat-generating equipment. The ECS is managed by an ECS controller positioned in at least one of the ITPAC and the ES modules. The ECS controller is responsive to sensor inputs to determine environmental requirements of the ITPAC module to select an environmental operating mode of the ES module. The method includes providing a communication test cable configured to carry sensor and control signals for operation of the ECS distributed between the ITPAC module and the ES module. The method includes determining, by the test controller, one or more functional tests for quality assurance of the ECS that are specified for the ITPAC module. For each of the one or more functional tests, the method includes identifying, by the test controller, at least one input signal value associated with the ES module. The method includes emulating, via the communication test cable connected between the portion of the ECS installed in the ITPAC module and the test controller, the identified at least one input signal value. The method includes determining, via the communication test cable, any response by the ITPAC module to the at least one input signal value. The method includes comparing the determined response to an expected response contained in a test application. The method includes generating and outputting test data based on the comparison.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is a three-dimensional view of the example test IHS testing the ITPAC module of the MDC of FIG. 2A, according to one or more embodiments;

DETAILED DESCRIPTION

Figure 1:
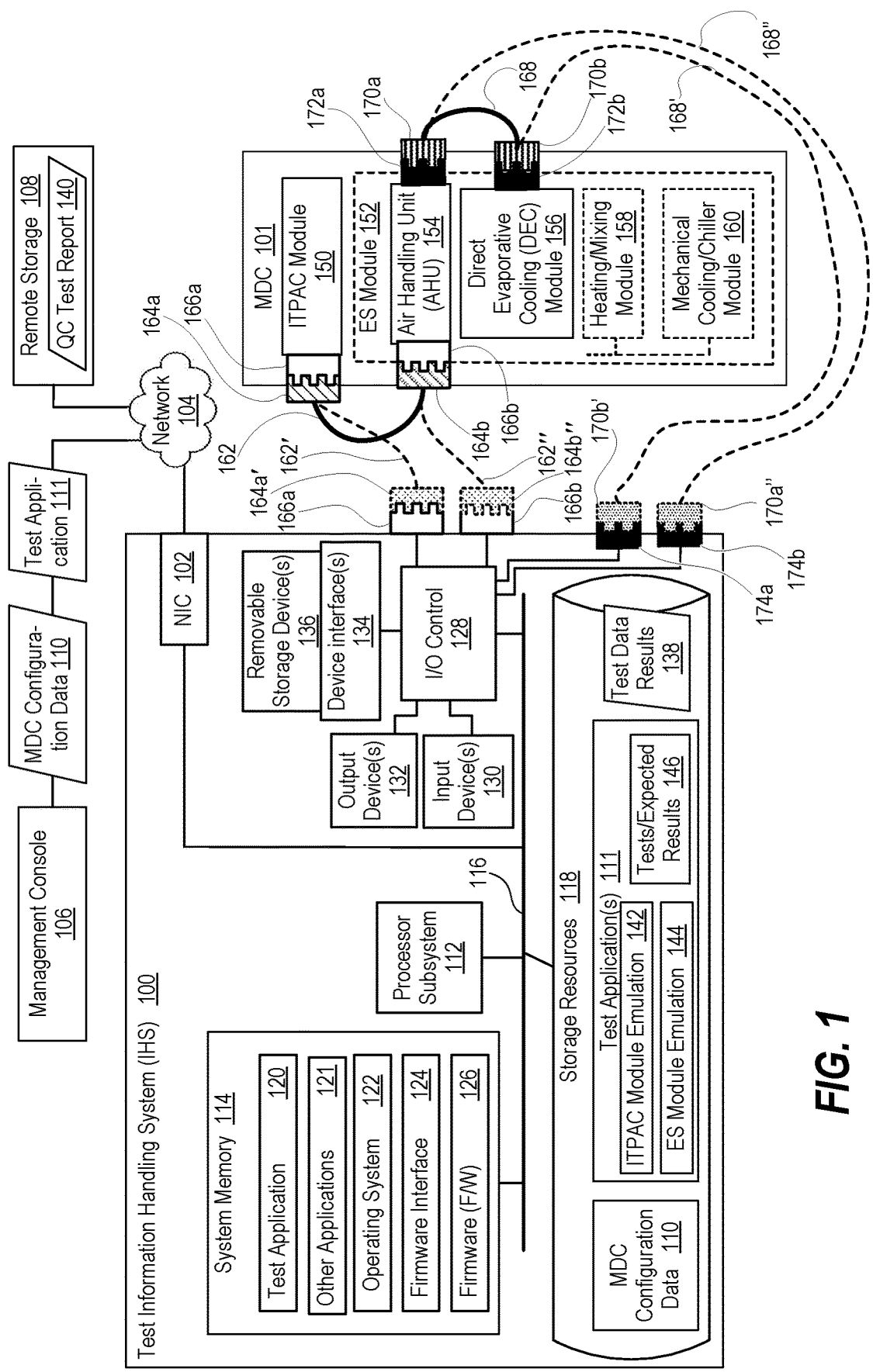
FIG. 1 is a block diagram representation of a test information handling system (IHS) that enables independent testing and validation of each component in an example modular data center (MDC), according to one or more embodiments.

The illustrative embodiments provide an information handling system (IHS), a method for functionally testing components of a modular data center (MDC) that is being manufactured, and a method for testing and separately deploying components of an MDC. The present disclosure enables independent testing and validation of each component in a modular solution. A test controller functionally tests components of an MDC that is being manufactured. Functional test(s) for quality assurance of an environmental control system (ECS) are determined for both an information technology pre-assembled component (ITPAC) module and an environmental system (ES) module that are each configured to be coupled together to cool heat-generating equipment of the ITPAC module at a deployed location. For each functional test(s), the test controller identifies input signal value(s) associated with one of the modules. The test controller emulates, via a communication test cable connected between the one module and the test controller, the identified input signal value(s). The test controller determines, via the communication test cable, any response by the one module to the input signal value(s). The test controller compares the determined response to an expected response and generates and outputs test data based on the comparison.

According to one aspect, test data can be later referenced for customer verification prior to commissioning an operational MDC. Test data can also provide a baseline of when a change in the operation occurs for determining responsibility for repair.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized, and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

FIG. 1 is a block diagram representation of a test information handling system (IHS) 100 ("test controller") that enables independent testing and validation of each component in an example modular data center (MDC) 101. Within the general context of IHSs, test IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, test IHS 100 may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Test IHS 100 includes a network interface, depicted as network interface controller (NIC) 102, in communication via network 104 for communicating with remote devices and systems, such as management console 106 and remote storage system 108. For example, management console 106 can provision test IHS 100 with MDC configuration data 110 and corresponding test applications 111. NIC 102 enables test IHS 100 and/or components within test IHS 100 to communicate and/or interface with other devices, services, and components that are located external to test IHS 100. These devices, services, and components can interface with test IHS 100 via an external network, such as network 104, using one or more communication protocols that include transport control protocol (TCP/IP) and network block device (NBD) protocol. Network 104 can be a local area network, wide area network, personal area network, and the like, and the connection to and/or between network 104 and test IHS 100 can be wired, wireless, or a combination thereof. For purposes of discussion, network 104 is indicated as a single collective component for simplicity. However, it should be appreciated that network 104 can include one or more direct connections to other devices as well as a more complex set of interconnections as can exist within a local area network or a wide area network, such as the Internet.

A processor subsystem 112 of test IHS 100 is coupled to system memory 114 via system interconnect 116. System interconnect 116 can be interchangeably referred to as a system bus, in one or more embodiments. System interconnect 116 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 116 can also be a Double Data Rate (DDR) memory interface. The system memory 114 can either be contained on separate, removable dual inline memory module (RDIMM) devices or system memory 114 can be contained within persistent memory devices such as non-volatile dual in-line memory modules (NVDIMMs). For example, the NVDIMM-N variety of NVDIMMs contain both random access memory, which can serve as system memory 114, and non-volatile memory. It should be noted that other channels of communication can be contained within system interconnect 116, including but not limited to i2c or system management bus (SMBus). System interconnect 116 communicatively couples various system components. Examples of system components include replaceable local storage resources 118 such as solid state drives (SDDs) and hard disk drives (HDDs). Software and/or firmware modules and one or more sets of data that can be stored on local storage resources 118 and be utilized during operations of test IHS 100. Specifically, in one embodiment, system memory 114 can include therein a plurality of such modules, including test application 120 and other applications 121, operating system (OS) 122, firmware interface 124, such as basic input/output system (BIOS) or Uniform Extensible Firmware Interface (UEFI), and platform firmware (FW) 126. These software and/or firmware modules have varying functionality when their corresponding program code is executed by processor subsystem 112 or secondary processing devices within test IHS 100. For example, other applications 121 may include a word processing application, a presentation application, and a management station application, among other applications.

Test IHS 100 further includes one or more input/output (I/O) controllers 128 that support connection by and processing of signals from one or more connected input device(s) 130, such as a keyboard, mouse, touch screen, or microphone. I/O controllers 128 also support connection to and forwarding of output signals to one or more connected output devices 132, such as a monitor or display device or audio speaker(s). Additionally, in one or more embodiments, one or more device interfaces 134, such as an optical reader, a universal serial bus (USB), a card reader, Personal Computer Memory Card International Association (PCMCIA) slot, and/or a high-definition multimedia interface (HDMI), can be associated with test IHS 100. Device interface(s) 134 can be utilized to enable data to be read from or stored to corresponding removable storage device(s) 136, such as a compact disk (CD), digital video disk (DVD), flash drive, or flash memory card. In one or more embodiments, device interface(s) 134 can further include general purpose I/O interfaces such as inter-integrated circuit (FC), system management bus (SMB), and peripheral component interconnect (PCI) buses. Local storage resources 118 can be updated or accessed in order to perform functional testing of MDC 101. For example, local storage resources 118 can contain MDC configuration data 110, test application(s) 111, and local copies of test data results 138. Periodically, test IHS 100 communicates test data results 138 to remote storage system 108 for incorporation into quality control (QC) test report 140. Test application(s) 111 includes functionalities such as ITPAC module emulation 142, ES module emulation 144, and a data structure 146 for defined functional tests for a selected module with expected results.

In a prototype implementation of test IHS 100, test application(s) 111 are on an application layer that runs on a system platform, which in this instance is a Windows based personal computer (PC). Windows based PC has for example computer readable storage devices that can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Test application(s) 111 generates log files and testing results that are store on external storage media to be transferred to a cloud repository (remote storage system 108).

The components of MDC 101 that are functionally tested and validated include information technology pre-assembled components (ITPAC) module 150 and environmental system (ES) module 152. ES module 152 can include air handling unit (AHU) 154 with one or more cooling/air conditioning units that are integral or attachable sub-components, such as direct evaporative cooling (DEC) module 156, heating/mixing module 158, and mechanical cooling/chiller module 160. Primary communication cable 162 is connectable between ITPAC module 150 and ES module 152 for intra-module communication, such as for environmental control during operation of MDC 101. In a particular one or more embodiments, ES module 152 includes multiple modules. Primary communication cable 162 is connected specifically to AHU 154. In one or more embodiments, primary communication cable 162 includes plug'n'play connector 164a that is keyed to engage to corresponding connector 166a of ITPAC module 150. Primary communication cable 162 also includes plug'n'play connector 164b that is keyed to engage to corresponding connector 166b of AHU 154. Test IHS 100 includes corresponding connectors 166a and 166b that can respectively receive connectors 164a and 164.

The particular component selection of environmental capabilities incorporated into ES module 152 are based on intended deployed location and requirements of ITPAC module 150. For example, environmental modes are defined on a psychrometric chart that is defined as a function of humidity and temperature. The boundaries of each mode are exclusively defined by values of temperature and mode. Modes can also be defined based on operational status of the capabilities of ES module 152. For example, failure of a mechanical cooling component can cause a degraded operating mode of using outside air without mechanical cooling. Based on these defined temperature/humidity definitions and failure modes that are associated with particular environmental modes, test application 120 has a plurality of tests defined to confirm the correct mapping of sensor states and operational capabilities to responses by the tested portion of MDC 101.

In a first test scenario, test IHS 100 substitutes for ES module 152. An alternate arrangement of primary connection cable 162 is depicted in phantom as primary connection cable 162' having alternately attached connector 164a, which also is depicted in phantom as connector 164a'. Connector 166a of test IHS 100 receives connector 164a' of primary connection cable 162'. In a second test scenario, test IHS 100 substitutes for ITPAC 150. An alternate arrangement of primary connection cable 162 is depicted in phantom as primary connection cable 162" having alternately attached connector 164b, which also is depicted in phantom as connector 164b". Connector 166b of test IHS 100 receives connector 164b" of primary connection cable 162".

A secondary communication cable 168 is connected between AHU 154 and a cooling/air conditioning sub-component, such as DEC module 156. In one or more embodiments, secondary communication cable 168 includes plug'n'play connector 170a that is keyed to engage to corresponding connector 172a of AHU 154. Secondary communication cable 168 includes plug'n'play connector 170b that is keyed to engage to corresponding connector 172b of DEC module 156. In a third test scenario, test IHS 100 individually tests AHU 154. Primary connection cable 162" is connected as described above for test scenario two. An alternate arrangement of secondary connection cable 168 is depicted in phantom as secondary connection cable 168' having alternately attached connector 170b, which also is depicted in phantom as connector 170b'. Connector 174a of test IHS 100 receives connector 170b' of secondary connection cable 168'. In a fourth test scenario, test IHS 100 individually tests DEC module 156. An alternate arrangement of secondary connection cable 168 is depicted in phantom as secondary connection cable 168" having alternately attached connector 170a, which also is depicted in phantom as connector 170a". Connector 174b of test IHS 100 receives connector 170a" of secondary connection cable 168".

For clarity, four individual keyed connectors 166a-b and 174a-b are depicted as being provided by test IHS 100. In one or more embodiments, fewer connectors can be used, such as one, two or three. Test IHS 100 determines what module is connected based on self-reporting by the module or by referencing a test setting.

Figure 2A:
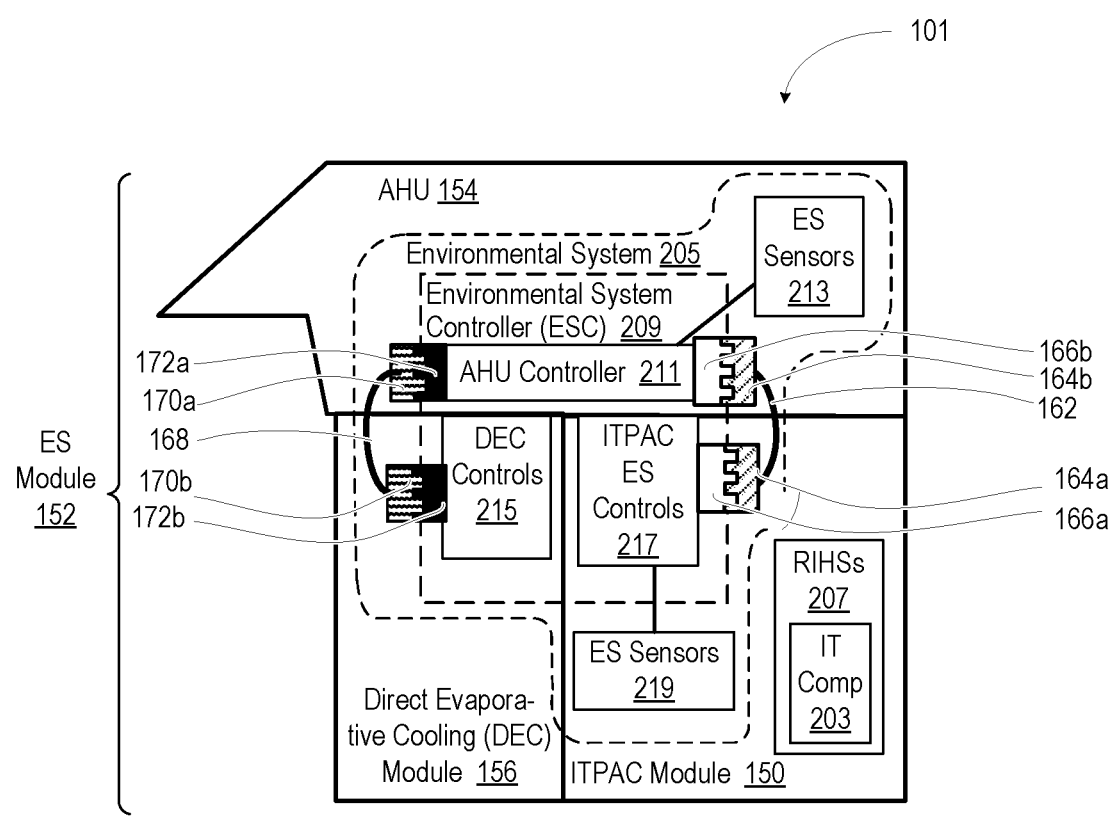
FIG. 2A is a simplified functional diagram of an example MDC having an assembled information technology pre-assembled components (ITPAC) module and environmental system (ES) module having an air handling unit (AHU) and a direct evaporative cooling (DEC) module, according to one or more embodiments.

FIG. 2A is a simplified functional diagram of example MDC 101 having ITPAC module 150 assembled with ES module 152, which includes AHU 154 and DEC module 156. Primary and secondary communication cables 162 and 168 can be lengthwise dimensioned for the close proximity of ITPAC module 150, AHU 154, and DEC module 156. ITPAC module 150 contains heat-generating information technology (IT) components 203 that are cooled by environmental system 205. In one or more embodiments, IT components 203 of IT MDC 101 are rack mounted within rack information handling systems (RIHS) 207. Air flow is directed within MDC 101 by environmental system 205, as managed by environmental system controller (ESC) 209. In one or more embodiments, ESC 209 is distributed between one or more of ITPAC module 150 and ES module 152. ECS 209 includes AHU controller 211 of AHU 154. AHU controller 211 actuates changes in sources of air (e.g., recirculate, outside, mixed), selects type of cooling (e.g., mechanical, evaporative), and actuates air movers. Certain ambient and internal environmental sensors 213 can be polled and monitored by AHU controller 211. AHU controller 211 can report operating mode or failure status of components of AHU 154. ESC 209 can include DEC controls 215 that manage evaporative cooling of supply air for IT components 203. DEC controls 215 can report operating mode or failure status of components of DEC module 156. ESC 209 can include ITPAC environmental controls 217 that manage environmental sensors 219 in ITPAC module 150. Environmental sensors 219 can sense one or more of: temperature, humidity, contaminants, pressure, etc., in specific locations. ITPAC environmental controls 217 can communicate limitations on operation of IT components 203 based on sensed conditions or reported cooling capacity of environmental system 205. ITPAC environmental controls 217 can report operating mode or failure status of components of ITPAC module 150 that affect environmental system 205.

Figure 2B:
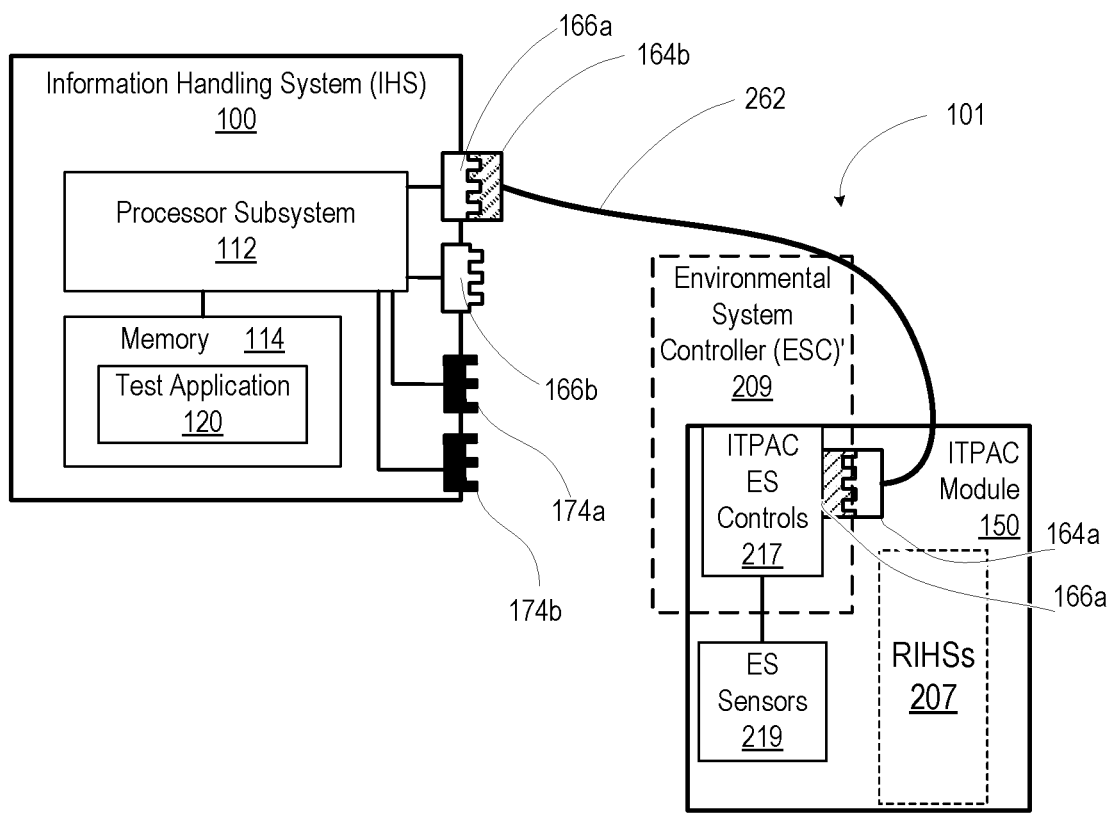
FIG. 2B is a simplified functional diagram of an example test IHS testing the ITPAC module of the MDC of FIG. 2A, according to one or more embodiments.

FIG. 2B is a simplified functional diagram of example test IHS 100 testing ITPAC module 150 of MDC 101 of FIG. 2A. ITPAC module 150 can be partially assembled with RIHSs 207 not installed. Test IHS 100 is communicatively coupled via communication test cable 262 to ITPAC module 150. Communication test cable 162 is functionally identical to, but longer than, primary communication cable 162 to enable greater separation from test IHS 100. Test IHS 100 substitutes for ES module 152 (FIG. 2A) that is not being tested. Test IHS 100 executes test application 120 which, in response to a trigger to test ITPAC module 150, enables Test IHS 100 to determine one or more functional tests that are specified for ITPAC module 150. For each of the one or more functional tests, test IHS 100: (i) identifies at least one input signal value that originate from ES module 152 (FIG. 2A) that test IHS 100 has to emulate; (ii) emulates, via communication test cable 262, the identified at least one input signal value; (iii) detects via communication test cable 262, any response by ITPAC module 150 to the at least one input signal value; (iv) compares the detected response to an expected response contained in test application 120; and (v) generates and outputs test data based on the comparison.

In one or more embodiments, test IHS 100 determines the one or more functional tests based on two or more environmental operating modes of ES module 152 (FIG. 2A) that are defined by a range of values of one or more environmental sensors. The operating modes include two or more of: (i) open; (ii) closed; (iii) mixed; (iv) dehumidified; (v) heated; and (vi) cooled. Test IHS 100 identifies the at least one input value based on identifying values of the one or more environmental sensors that correspond to each one of the two or more environmental operating modes. Test IHS 100 sequentially emulates the one or more environmental sensors 219 of ITPAC module 150 that correspond to each one of the two or more environmental operating modes. Test IHS 100 determines the response by ES module 152 (FIG. 2A). In one or more particular instances, the response indicates a current environmental operating mode. Test IHS 100 compares the current environmental operating mode to the environmental operating mode associated with the identified values of the one or more environmental sensors 219.

Figure 2C:
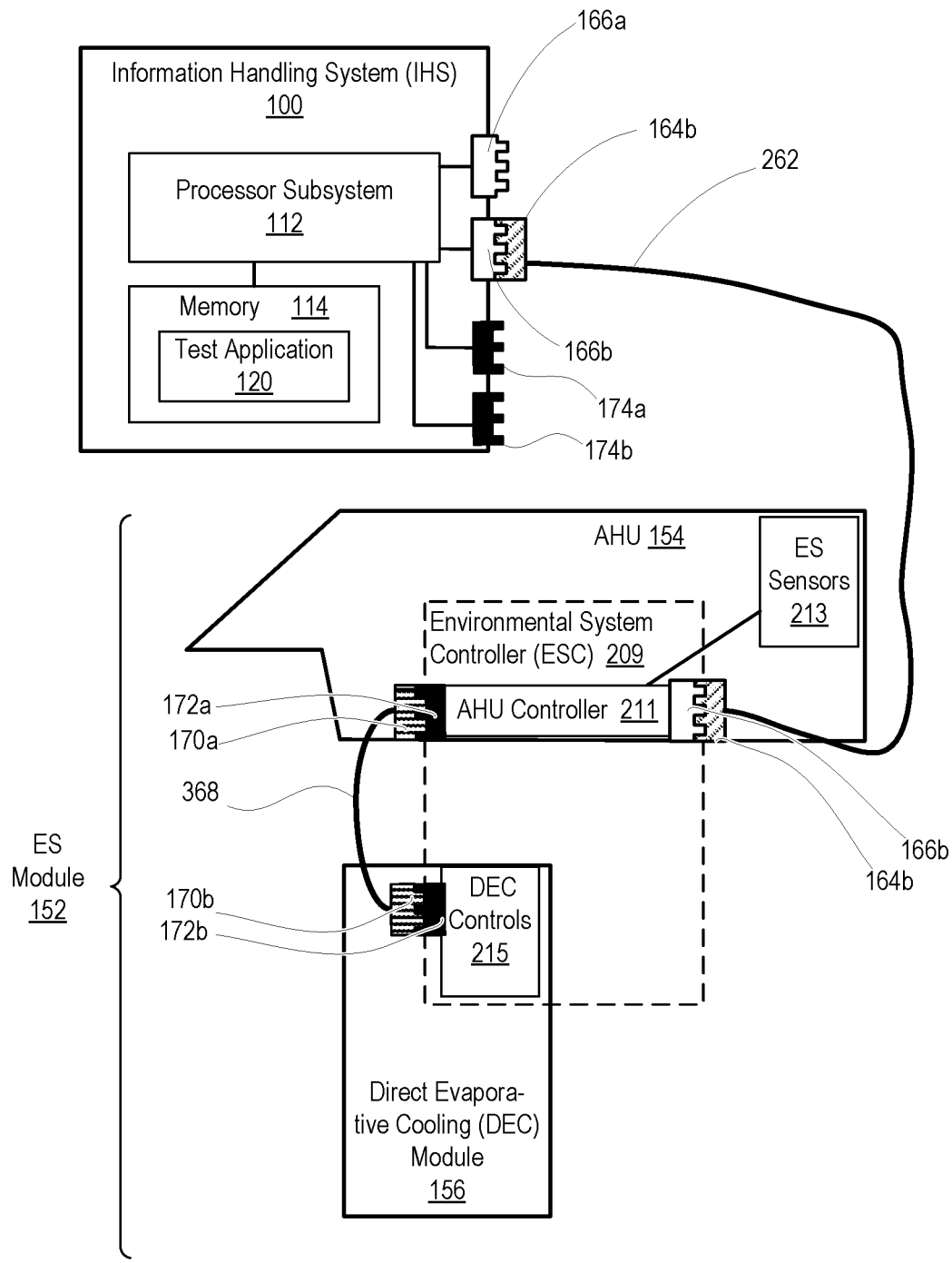
FIG. 2C is a simplified functional diagram of the example test IHS testing the ES module of the MDC of FIG. 2A, according to one or more embodiments.

FIG. 2C is a simplified functional diagram of example test IHS 100 testing ES module 152 of MDC 101. Test IHS 100 is connected to a portion of ESC 209 of ES module 152 via communication test cable 262. Specifically, test IHS 100 is connected to AHU controller 211 of AHU 154. AHU 154 includes ES sensors 213. AHU controller 211 is also connected via secondary communication test cable 368 to DEC controls 215 of DEC module 156. Secondary communication test cable 368 is functionally identical to secondary communication cable 168. In one or more embodiments, secondary communication test cable 368 is the secondary communication cable 168. In one or more embodiments, secondary communication test cable 368 is longer than the secondary communication cable 168 so that testing can be done with additional spacing between components. Test application 120 enables test IHS 100 to: (i) determine the one or more functional tests based on two or more environmental operating modes of ES module 152 that are defined by a range of values of one or more environmental sensors, the operating modes including two or more of: (a) open; (b) closed; (c) mixed; (d) dehumidified; (e) heated; and (f) cooled; (ii) identify the at least one input value based on identifying values of the one or more environmental sensors that correspond to each one of the two or more environmental operating modes; (iii) sequentially emulate the one or more environmental sensors of ITPAC module 150 that correspond to each one of the two or more environmental operating modes; (iv) determine the response by ES module 152, which can be an indication of a current environmental operating mode; and (v) compare the current environmental operating mode to the environmental operating mode associated with the identified values of the one or more environmental sensors.

Figure 2D:
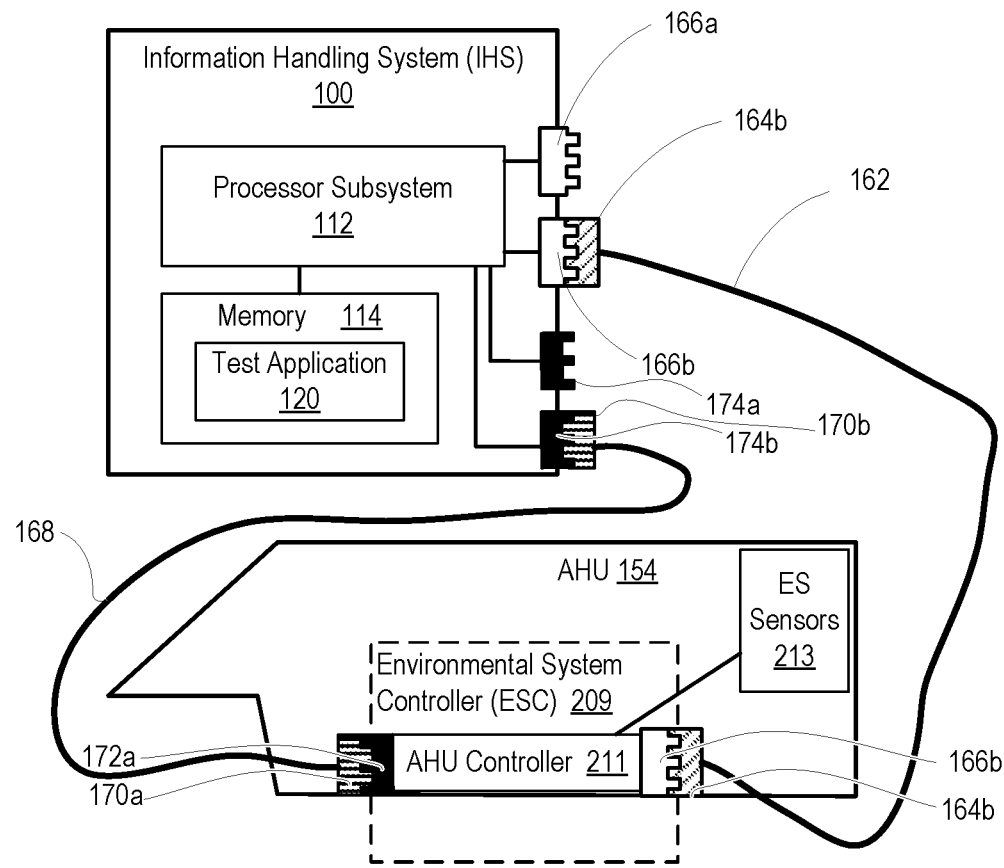
FIG. 2D is a simplified functional diagram of the example test IHS testing the AHU of the MDC of FIG. 2A, according to one or more embodiments.

FIG. 2D depicts a simplified functional diagram of example test IHS 100 testing AHU 154. Test IHS 100 substitutes for ITPAC module 150 (FIG. 2A) by being connected to primary communication test cable 162. Test IHS 100 substitutes for DEC module 156 (FIG. 2A) by being connected to secondary communication test cable 168. Test IHS 100 emulates sensor and control signals for both of ITPAC and DEC modules 150, 156 to functionally test AHU 154. AHU 154 can be separately manufactured and tested without the inconvenience of moving AHU 156 to either ITPAC module 150 or DEC module 156 (FIG. 2A).

Figure 2E:
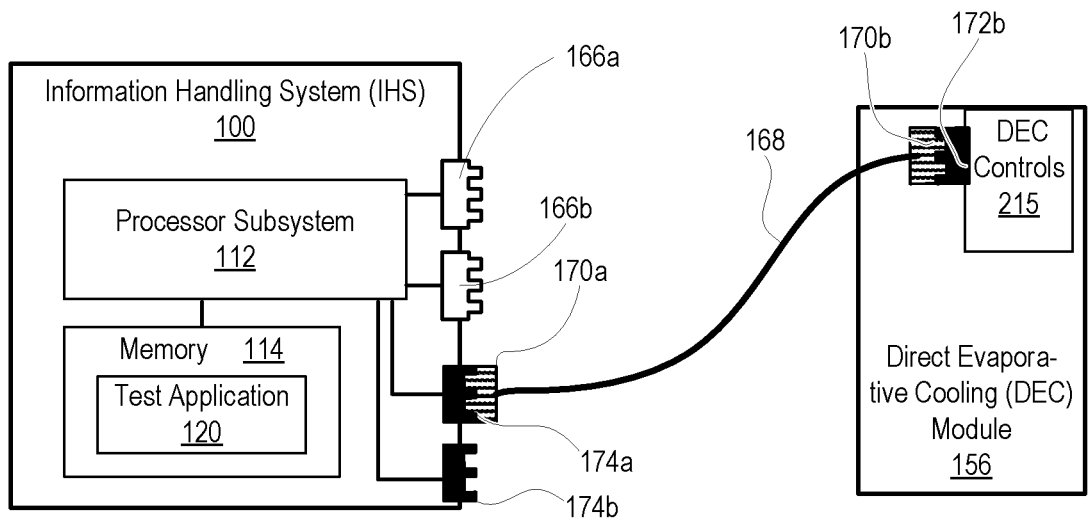
FIG. 2E is a simplified functional diagram of the example test IHS testing the DEC module of the MDC of FIG. 2A, according to one or more embodiments.

FIG. 2E depicts a simplified functional diagram of example test IHS 100 testing DEC module of the MDC of FIG. 2A. Test IHS 100 substitutes for AHU 156 (FIG. 2A) by being connected to secondary communication test cable 168. Test IHS 100 emulates sensor and control signals for AHU 154 to functionally test DEC module 156. DEC module 156 can be separately manufactured and tested without the inconvenience of moving DEC module 156 to AHU 154 (FIG. 2A).

FIG. 3A depicts a three-dimensional view of the example test IHS 100, which is attached to test cart 303. Test IHS 100 is testing example ITPAC module 350. ITPAC module 350 includes volumetric container 305 that is sized for being placed on a truck trailer or in a shipping container for transport to a production site or an operational site via a road, railway, or waterway. ITPAC module 350 can have mounting provisions for a longitudinal row of RIHSs 207 that may be installed before or after functional testing of environmental system equipment.

Figure 3B:
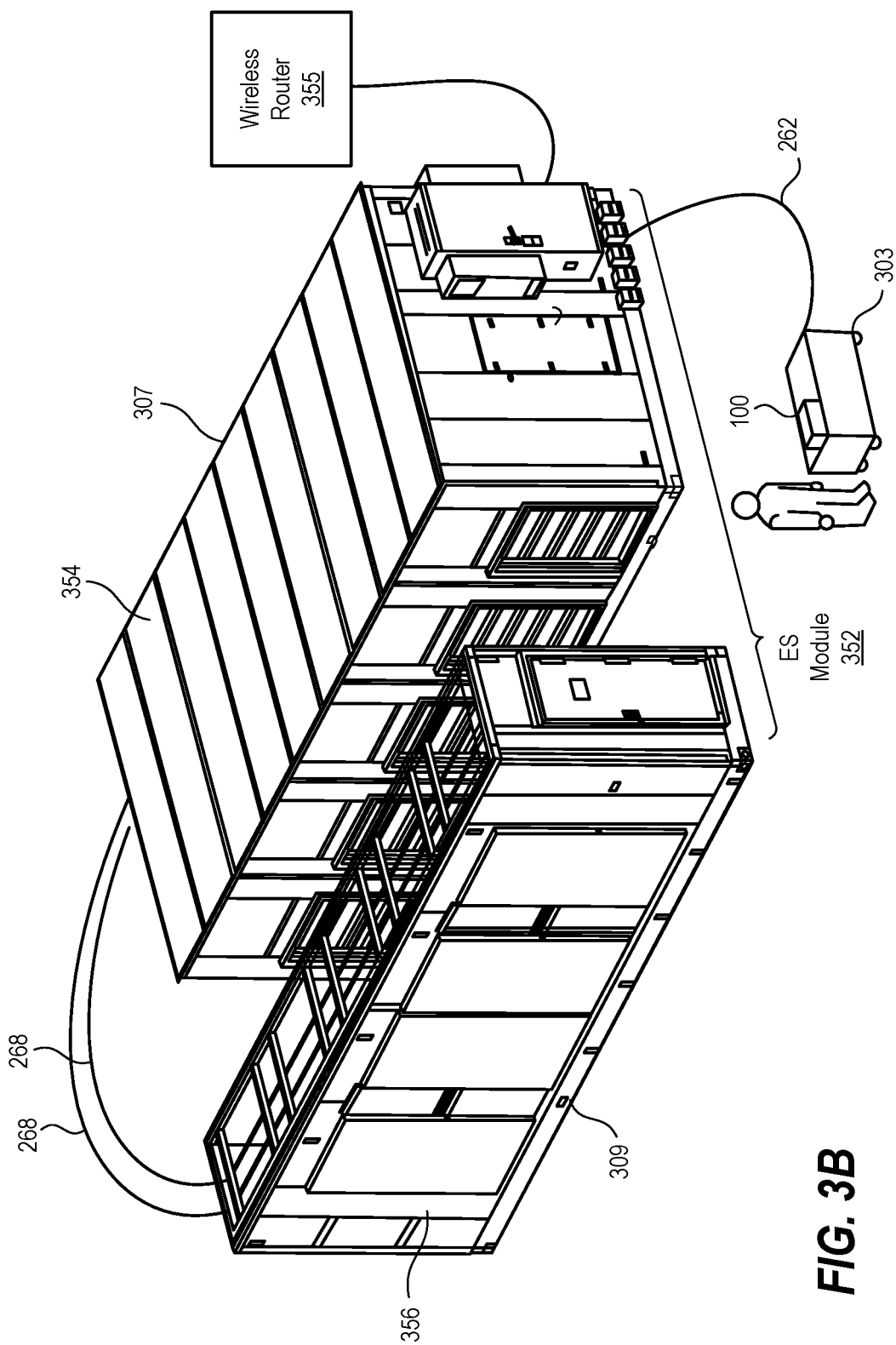
FIG. 3B is a three-dimensional view of the example test IHS testing the ES module of the MDC of FIG. 2A, according to one or more embodiments.

FIG. 3B is a three-dimensional view of the example test IHS 100 on test cart 303 testing ES module 352, which includes AHU 354 and DEC module 356. AHU 354 is connected to wireless router 355. Each of AHU 354 and DEC module 356 include corresponding volumetric containers 307, 309 that are sized for being placed on a truck trailer or in a shipping container for transport to a production site or an operational site via a road, railway, or waterway.

In a proof of concept prototype for enhanced functional testing that is depicted in FIGS. 3A-B, a methodology was implemented for consistent standardized modular wiring connectivity so that modules, such as ITPAC module 150 and ES module 152, can be connected in the same way in every MDC product line. This connectivity is achieved by intra-module connectorization of the MDC sub systems using the same type of connector, pin type, pin count, and pin arrangement. Second, a process and a test plan were developed to systematically test the single module or set of modules. Along with the test plans, a system test crash cart (i.e., test IHS 100 attached to test cart 303) was developed to simulate the system features, while executing the test plans. The test crash cart acts to test ITPAC module 350 ahead of the manufacture of DEC module 356 and AHU 354, which are all modules of MDC 300. Once ITPAC module 150 is tested, ITPAC module 150 is shipped for integration of server components. After DEC module 356 and AHU 354 have been manufactured and the modules are ready for testing and validation, test IHS 100 is used to simulate ITPAC module 350 in the absence of ITPAC module 350. This approach employs time saving solutions in test automation, enables tracking of issues via quality control (QC) reports, and provides a cloud repository of QC reports that can be used for quality audits and future reference. The QC reports can be referenced before final assembly to confirm that the modules were working before being assembled into MDC 101. If a defect or failure is detected after installation at the deployed location, the QC report provides a baseline. Actions that happened subsequent to the functional testing at the destination site can be assessed for creating a defect or failure, enabling assignment of responsibility to the appropriate vendor or customer. The defect can be shown to have arisen during final stages of installation and not to be a latent defect or failure that arose at the original equipment manufacturer.

The above described approach allows testing and validating of MDC sub-sections on an individual or group basis to facilitate manufacturing and MDC installations at the production sites. As one benefit, the approach accelerates customer delivery of the MDC for service. The approach also allows functional testing of single module systems in the absence of other supporting modules that complete a full system. As additional benefits, the approach reduces current commissioning start up time, field repairs, and wiring errors. There is no need for a qualified electrician to make the module connections. With the described implementations, improvement in customer readiness of the installed MDC has been shown to be increased by up to 50%. Additionally, automated, self-running and push button test controls for QC summary reports are provided for. The present disclosure provides for generating pass/fail criteria. Reduction in quality issues discovered in the field by up to 70% has been shown. The failed components are found and replaced at the factory rather than in the field. The present disclosure further enables tracking of issues found post manufacture of the modules using a cloud data repository, which allows for future reference and auditing.

Figure 4A:
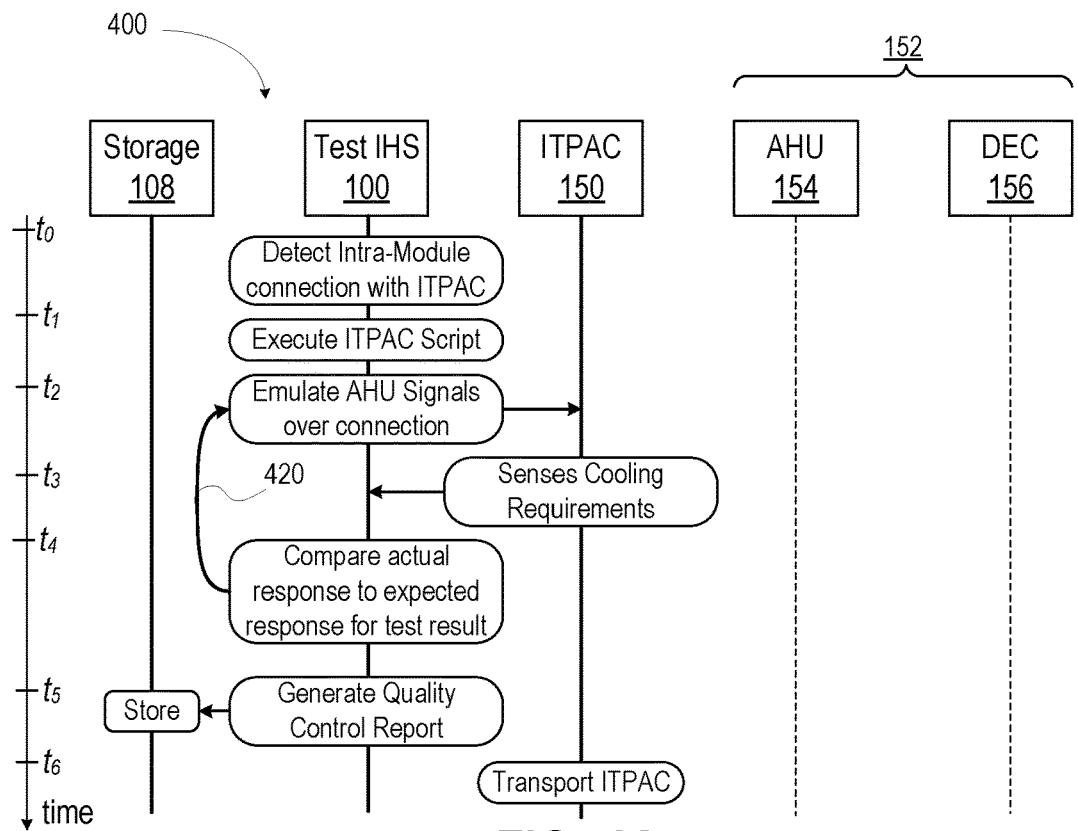
FIG. 4A is a timing diagram of functional testing of the ITPAC module, according to one or more embodiments.

FIG. 4A is a timing diagram 400 of interactions between test IHS 100 and components of MDC 101 during functional testing. In particular MDC 101 includes ITPAC module 150. Other components of MDC 101 are not available for integrated testing, such as ES module 152, which includes AHU 154 and DEC module 156. Test IHS 100 also interacts with remote storage system 108. At time $t=t_0$, test IHS 100 detects intra-module connection with ITPAC module 150. In response at time $t=t_1$, test IHS 100 executes an ITPAC test script. At time $t=t_2$, test IHS 100 emulates AHU signals over connection. At time $t=t_3$, ITPAC module 150 senses and communicates cooling requirements over connection to test IHS 100. At time $t=t_4$, test IHS 100 compares the actual response to the expected response as a test result. As depicted by arrow 420, IHS 150 then emulates AHU responses and monitors responses by ITPAC module 150 until tests are complete. At time $t=t_5$, test IHS 100 generates quality control report based on the test data that is transmitted to remote storage system 108 for storage and later access. At time $t=t_6$, ITPAC module 150 is transported for additional manufacturing steps such as IT component installation and/or deployment to operational site.

Figure 4B:
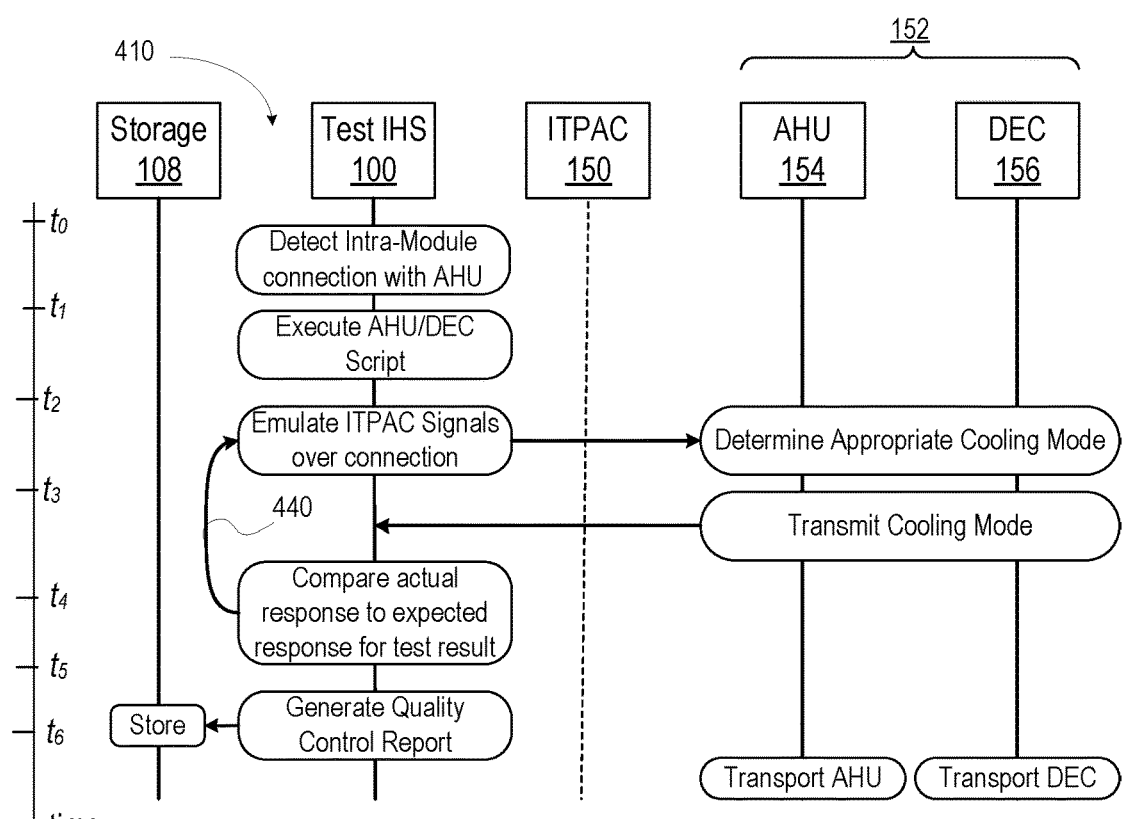
FIG. 4B is a timing diagram of functional testing of the ES module, according to one or more embodiments.

FIG. 4B is a timing diagram 410 of interactions between test IHS 100 and components of MDC 101 during functional testing. In particular, AHU 154 and DEC module 156 of ES module 152 are tested. Other components of MDC 101, such as ITPAC module 150, are not available for integrated testing. Separate testing of ITPAC module 150 can occur before, after, or concurrently with testing of ES module 152. At time $t=t_0$, test IHS 100 detects intra-module connection with AHU. At time $t=t_1$, test IHS 100 executes AHU/DEC script. At time $t=t_2$, test IHS 100 emulates ITPAC module signals over connection with AHU, which determines appropriate cooling mode. At time $t=t_3$, AHU 154 transmits operational responses such as cooling mode to test IHS 100. At time $t=t_4$, test IHS 100 compares the actual response to the expected response as a test result. As depicted by arrow 440, IHS 150 emulates ITPAC module and monitors responses by ES module 152 until all tests are complete. At time $t=t_5$, test IHS 100 generates quality control report based on the test results that is transmitted to remote storage system 108 for storage and later access. At time $t=t_6$, ES module 152 of AHU 154 and DEC module 156 are transported to the operational site. Then the sequence through timing diagram 410 is complete.

Figure 5A:
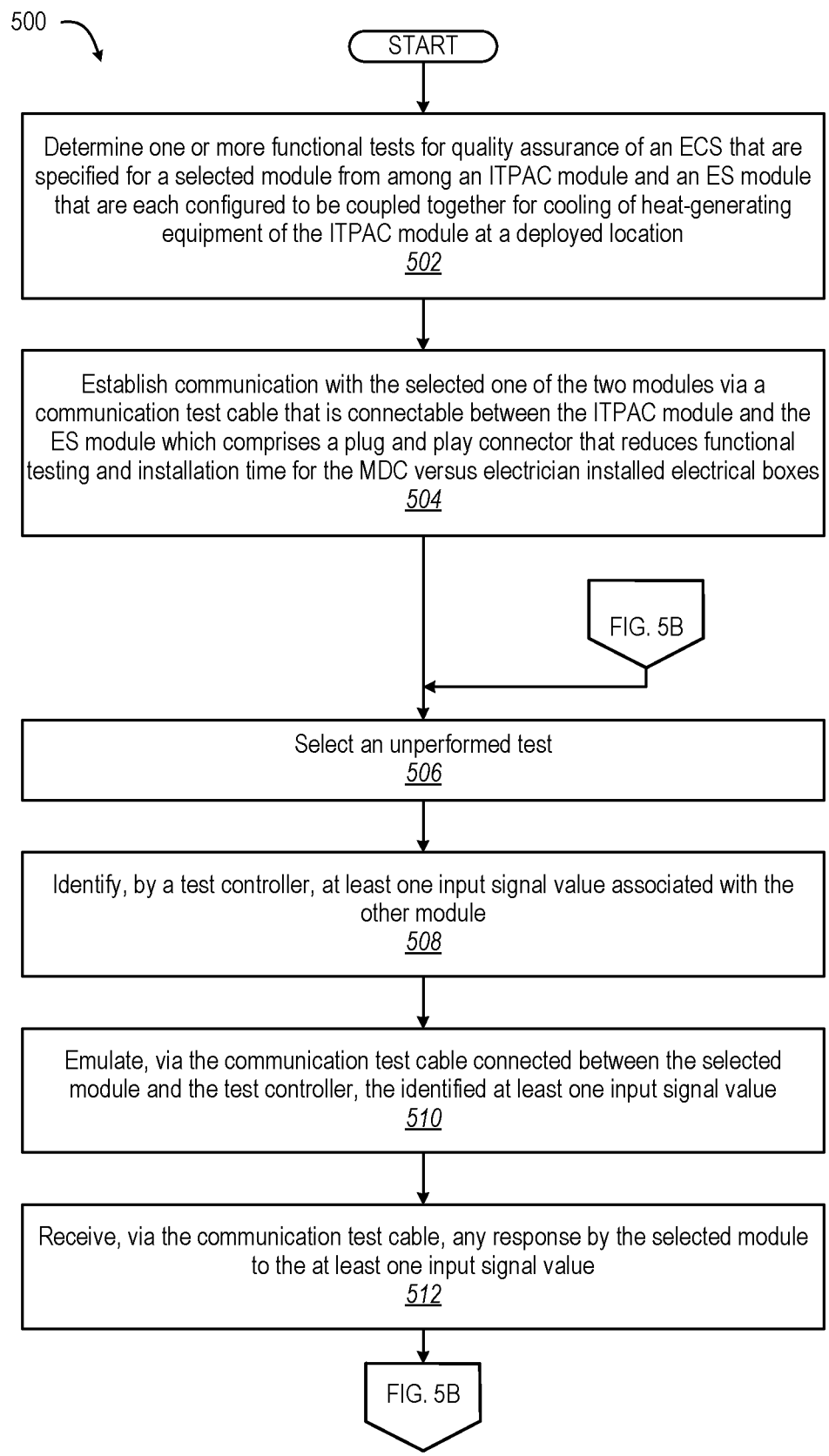
FIGS. 5A-5B present a flow diagram of an example method for functionally testing components of an MDC that is being manufactured, according to one or more embodiments.
Figure 5B:
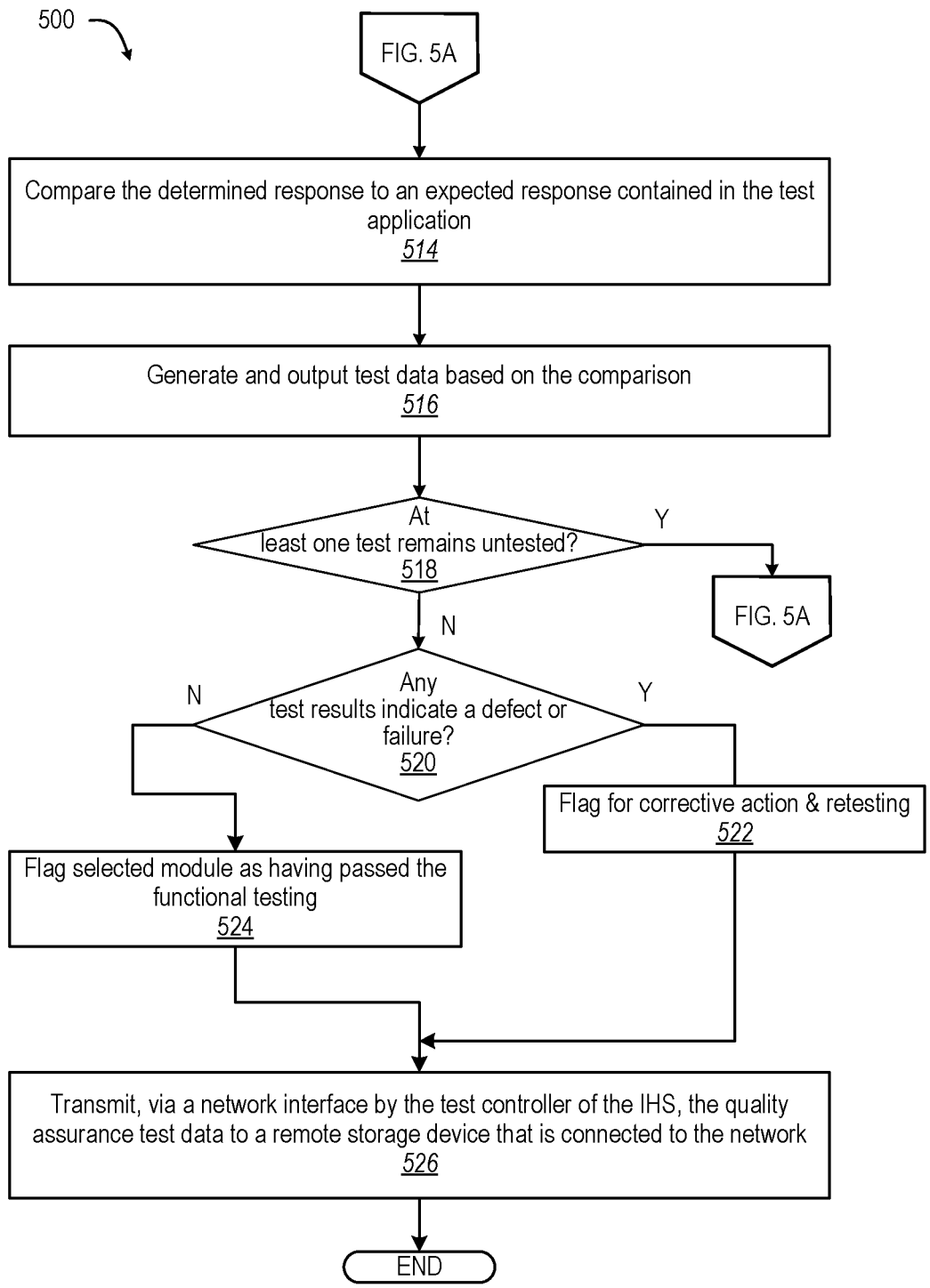

FIGS. 5A-5B (FIG. 5) present a flow diagram of example method 500 for functionally testing modular components of MDC 101 (FIG. 1) that are being manufactured. The description of the method is provided with general reference to the specific components illustrated within the preceding FIGS. 1-4. In one embodiment, method 500 can be implemented using test IHS 100 (FIG. 1). With reference to FIG. 5A, method 500 includes determining one or more functional tests for quality assurance of an ECS that are specified for a selected module from among an ITPAC module and an ES module that are each configured to be coupled together to provide cooling of heat-generating equipment of the ITPAC module at a deployed location (block 502). The other module that is not the selected module of the ITPAC module and ES module is unavailable for integrated testing. The combination of the modules provide operational use as an MDC. Method 500 includes establishing communication with the selected one of the two modules via a communication test cable that is connectable between the ITPAC module and the ES module and which includes a plug and play connector that reduces functional testing and installation time for the MDC versus electrician installed electrical boxes (block 504). Method 500 includes selecting an unperformed test (block 506). Method 500 includes identifying, by a test controller, at least one input signal value associated with the other module (block 508). Method 500 includes emulating, via the communication test cable connected between the selected module and the test controller, the identified at least one input signal value (block 510). Method 500 includes receiving, via the communication test cable, any response by the selected module to the at least one input signal value (block 512).

With reference to FIG. 5B, method 500 includes comparing the determined response to an expected response contained in the test application (block 514). Method 500 includes generating and outputting test data based on the comparison (block 516). A determination is made, in decision block 518, whether at least one test remains untested. In response to determining that at least one test remains untested, method 500 returns to block 506 (FIG. 5A). In response to determining that there are no tests remaining, method 500 includes determining, in decision block 520 whether any test results indicate a defect or failure by the component. In response to determining that any of the test results indicate a defect or failure, method 500 includes flagging the tested component as requiring corrective action and retesting (block 522). In response to determining that none of the test results indicates a defect or failure, method 500 includes flagging selected module as having passed the functional testing (block 524). After flagging the selected module for having defects/failures or having passed functional testing, method 500 include transmitting, via a network interface by the test controller of the IHS, the quality assurance test data to a remote storage device that is connected to the network (block 526) Then method 500 ends.

Figure 6A:
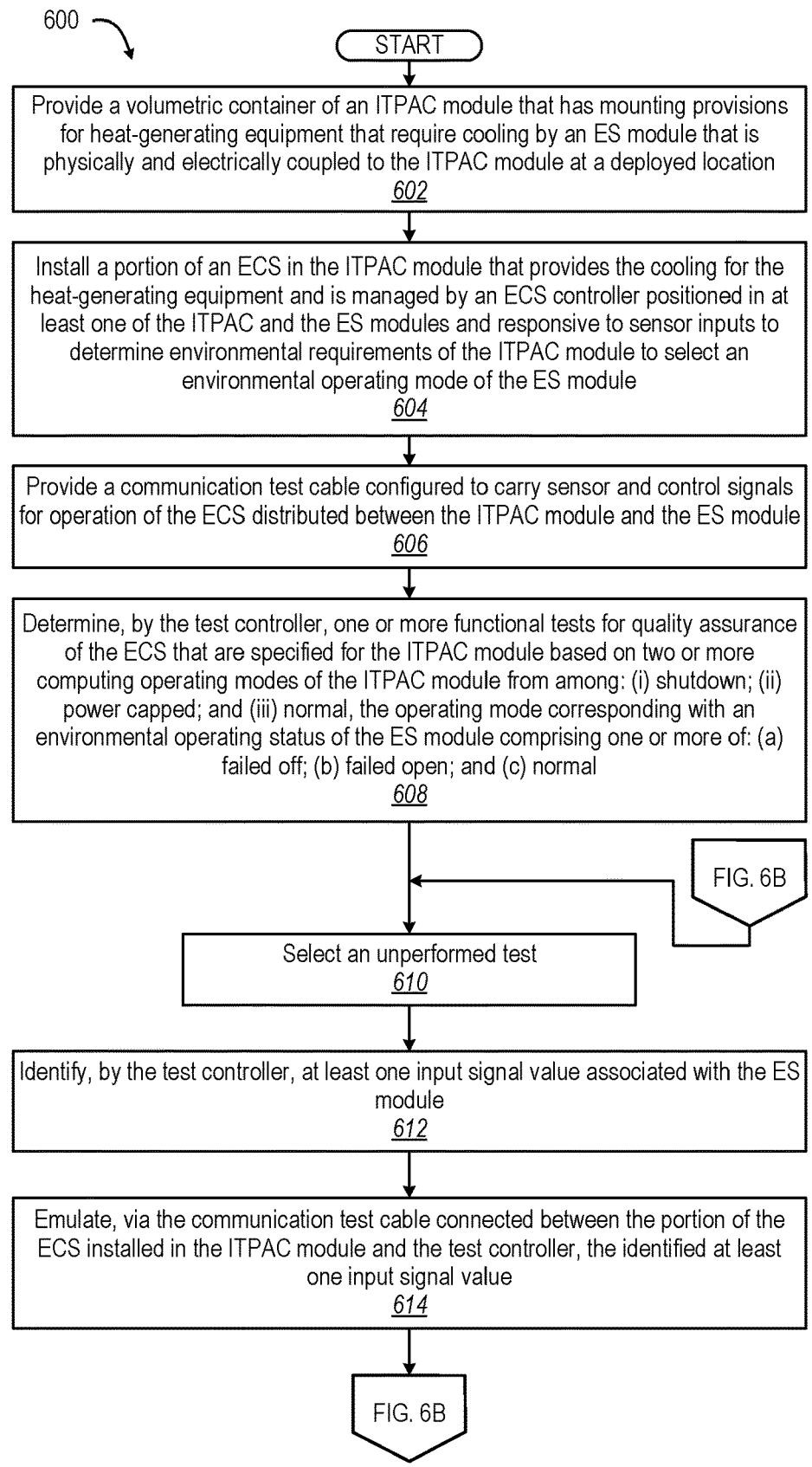
FIGS. 6A-6D present a flow diagram of an example method for separately testing and separately deploying components of an MDC, according to one or more embodiments.
Figure 6B:
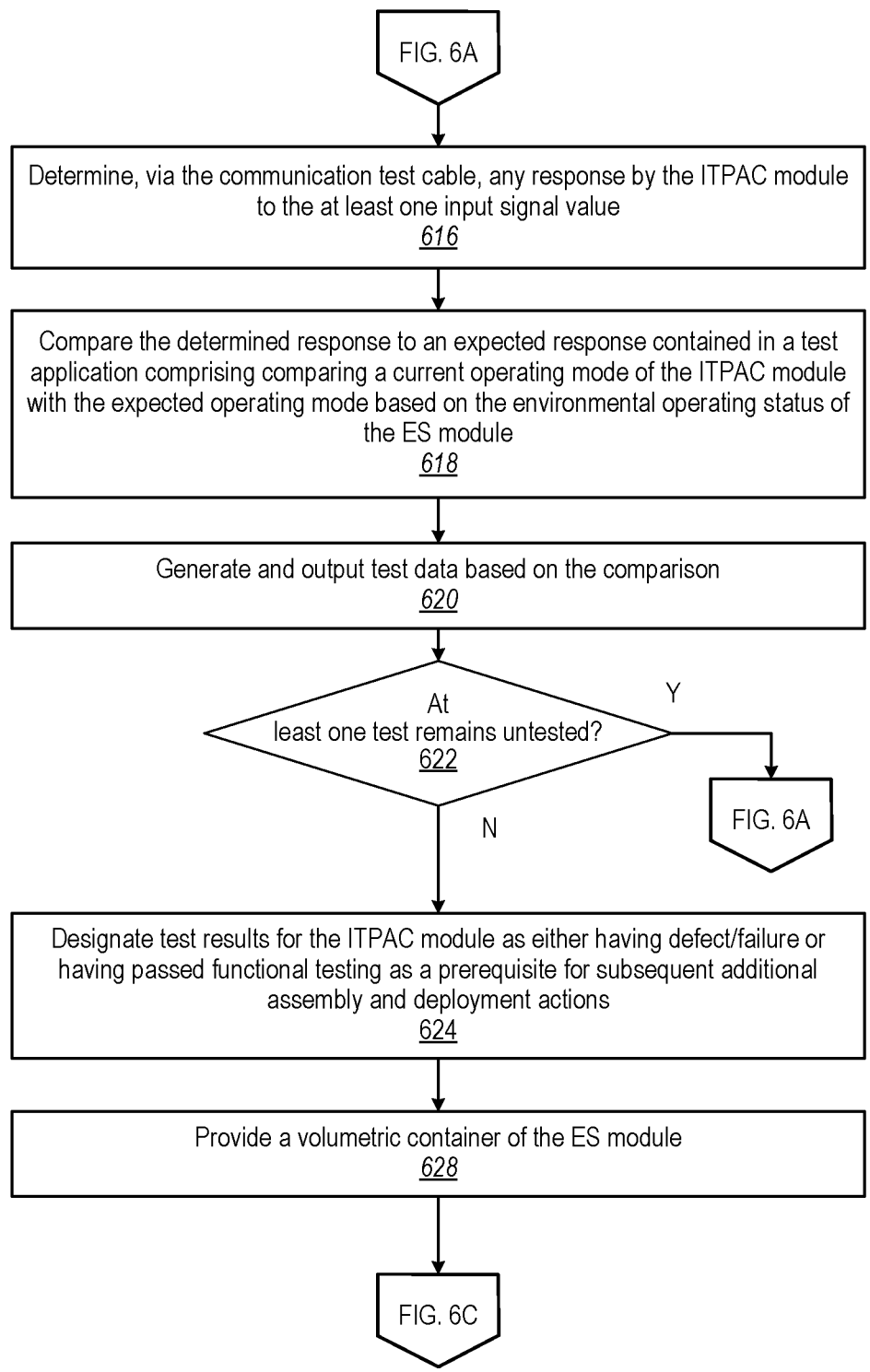
Figure 6C:
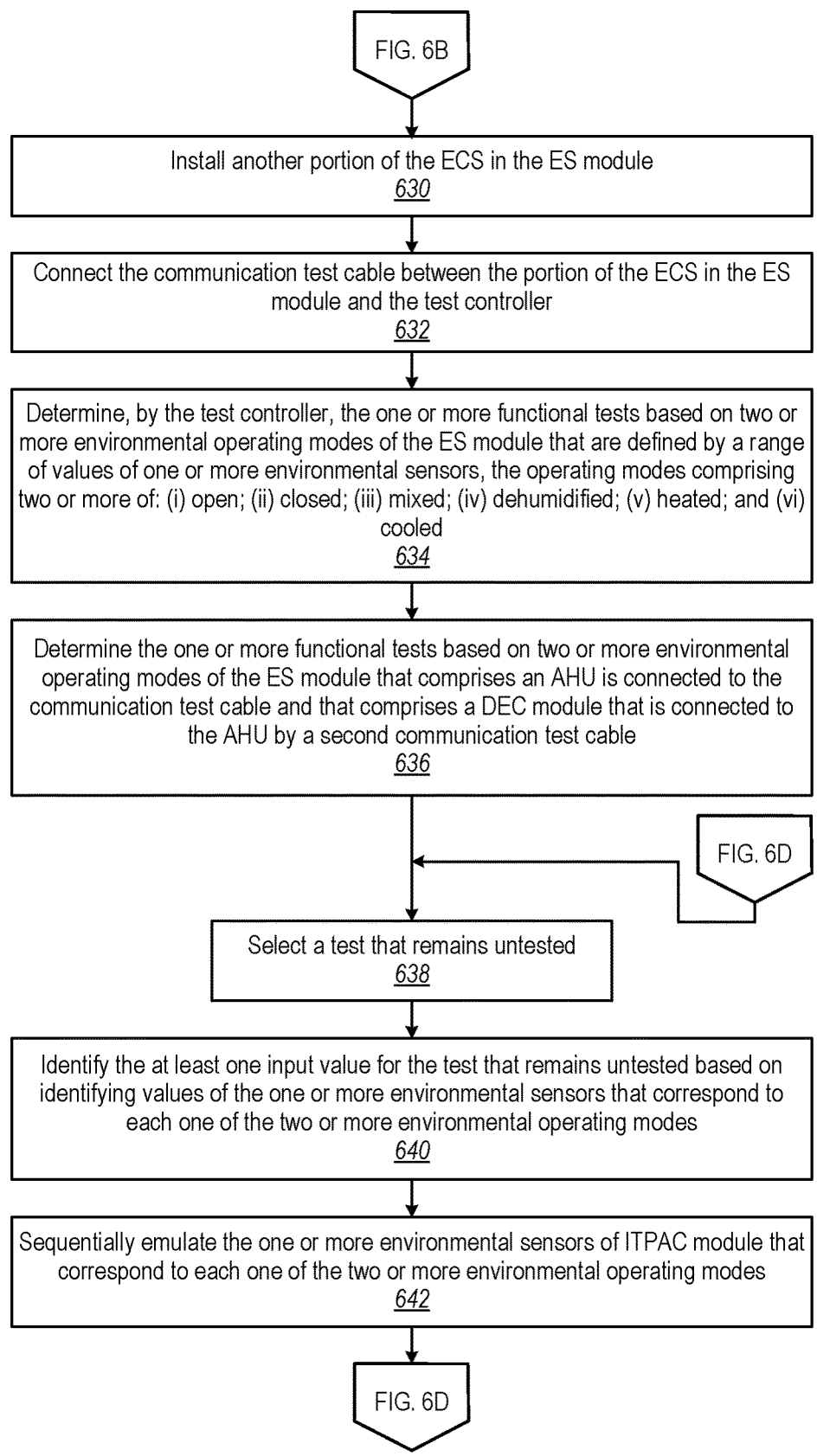
Figure 6D:
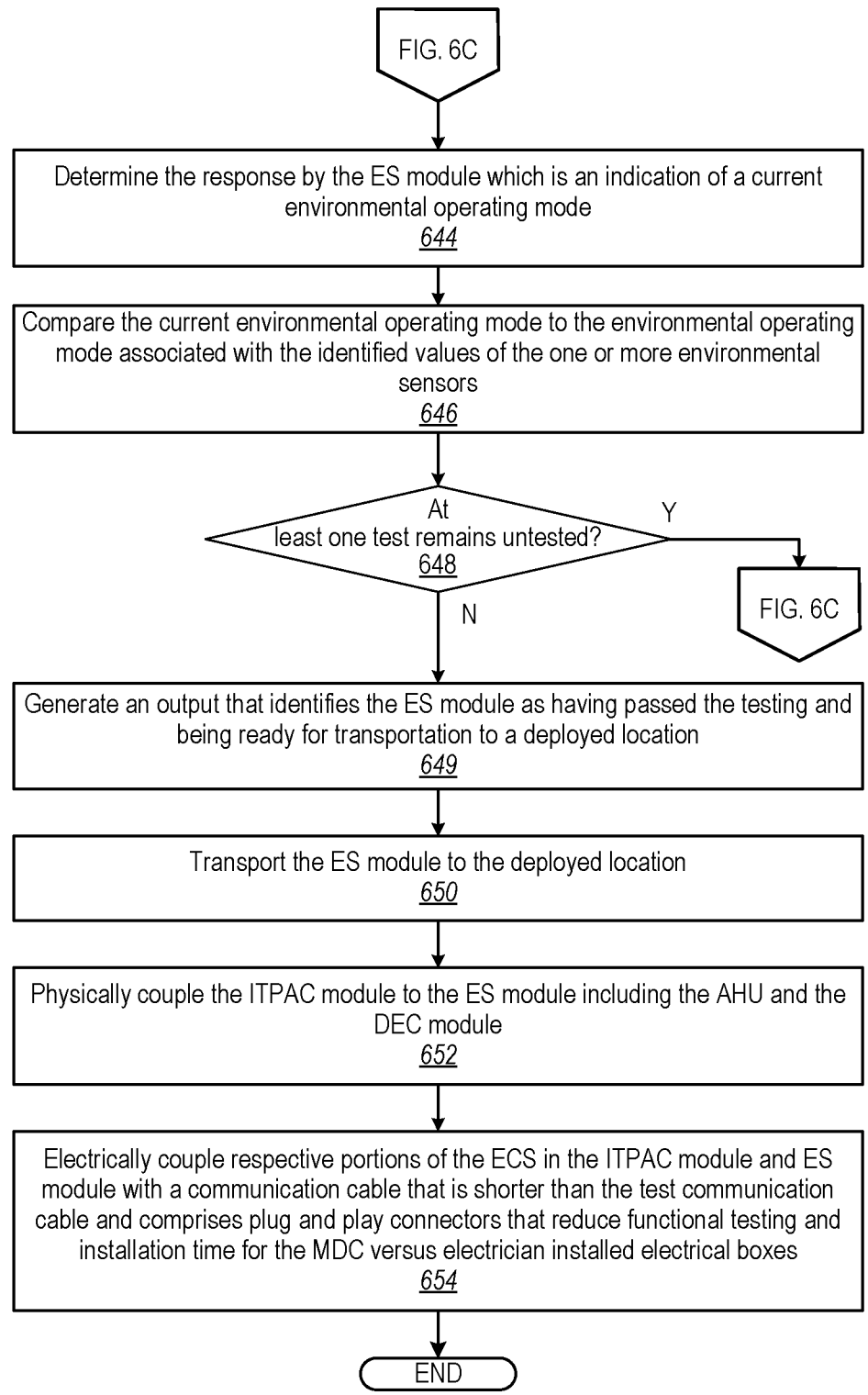

FIGS. 6A-D (FIG. 6) present a flow diagram of example method 600 for separately testing and separately deploying components of an MDC. The description of the method is provided with general reference to the specific components illustrated within the preceding FIGS. 1-4. In one embodiment, method 600 can be implemented using automated assembly equipment or machines that are at least partially controlled by a controller or IHS. With reference to FIG. 6A, method 600 includes providing a volumetric container of an ITPAC module that has mounting provisions for heat-generating equipment that require cooling by an ES module that is physically and electrically coupled to the ITPAC module at a deployed location (block 602). Method 600 includes installing a portion of an ECS in the ITPAC module (block 604). The ECS provides the cooling for the heat-generating equipment and is managed by an ECS controller positioned in at least one of the ITPAC and the ES modules. The ECS is responsive to sensor inputs to determine environmental requirements of the ITPAC module to select an environmental operating mode of the ES module. Method 600 includes providing a communication test cable configured to carry sensor and control signals for operation of the ECS distributed between the ITPAC module and the ES module (block 606). Method 600 includes determining, by the test controller, one or more functional tests for quality assurance of the ECS that are specified for the ITPAC module based on two or more computing operating modes of the ITPAC module from among: (i) shutdown; (ii) power capped; and (iii) normal (block 608). The operating mode corresponds with an environmental operating status of the ES module including one or more of: (a) failed off; (b) failed open; and (c) normal. Method 600 includes selecting an unperformed test (block 610). Method 600 includes identifying, by the test controller, at least one input signal value (corresponding to the unperformed test) associated with the ES module (block 612). Method 600 includes emulating, via the communication test cable connected between the portion of the ECS installed in the ITPAC module and the test controller, the identified at least one input signal value (block 614). In one or more embodiments, the at least one input signal value is the next environmental operating status of the ES module. Method includes determining, via the communication test cable, any response by the ITPAC module to the at least one input signal value (block 616). Method 600 includes comparing the determined response to an expected response contained in a test application (block 618). In one embodiment, method 600 includes comparing a current operating mode of the ITPAC module with the expected operating mode based on the environmental operating status of the ES module. Method 600 includes generating and outputting test data based on the comparison (block 620). A determination is made, in decision block 622, whether at least one test remains untested. In response to determining that at least one test remains untested, method 600 returns to block 610. In response to determining that there are no tests remaining, method 600 includes designating test results for the ITPAC module as either having defects/failures or having passed functional testing as a prerequisite for subsequent additional assembly and deployment actions (block 624). Defects or failures detected during testing result in corrective action and retesting.

Method 600 includes providing a volumetric container of the ES module (block 628). Method 600 includes installing another portion of the ECS in the ES module (block 630). Method 600 includes connecting the communication test cable between the portion of the ECS in the ES module and the test controller (block 632). Method 600 includes determining, by the test controller, the one or more functional tests based on two or more environmental operating modes of the ES module that are defined by a range of values of one or more environmental sensors, the operating modes including two or more of: (i) open; (ii) closed; (iii) mixed; (iv) dehumidified; (v) heated; and (vi) cooled (block 634). Method 600 includes determining the one or more functional tests based on two or more environmental operating modes of the ES module, which includes an AHU connected to the communication test cable and a DEC module that is connected to the AHU by a second communication test cable (block 636). Method 600 includes selecting a test that remains untested (block 638). Method 600 includes identifying the at least one input value defined for the test that remains untested based on identifying values of the one or more environmental sensors that correspond to each one of the two or more environmental operating modes (block 640). Method 600 includes sequentially emulating the one or more environmental sensors of ITPAC module that correspond to each one of the two or more environmental operating modes (block 642). Method 600 includes determining the response by the ES module, which is an indication of a current environmental operating mode (block 644). Method 600 includes comparing the current environmental operating mode to the environmental operating mode associated with the identified values of the one or more environmental sensors (block 646). Defects detected during testing can result in corrective action and retesting. A determination is made, in decision block 648, whether at least one test remains. In response to determining that at least one test remains, method 600 returns to block 638. In response to determining that no test remains, method 600 includes generating an output that identifies the ES module as having passed the testing and being ready for transportation to a deployed location (block 649).

Method 600 includes transporting the ES module to the deployed location (block 650). At the deployed location, method 600 includes physically coupling the ITPAC module to the ES module including the AHU and the DEC module (block 652). Method 600 includes electrically coupling respective portions of the ECS in the ITPAC module and ES module with a communication cable that is shorter than the test communication cable and includes plug and play connectors that reduce functional testing and installation time for the MDC versus the time required when using electrician installed electrical boxes (block 654). Then, method 600 ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
a memory containing a test application that defines functional tests for quality assurance of an environmental control system (ECS) distributed between an information technology pre-assembled component (ITPAC) module and an environmental system (ES) module, the functional tests performable during separate assembly of the ITPAC module and the ES module, the ITPAC module and the ES module configured for being coupled together for cooling of heat-generating equipment of the ITPAC module at a deployed location for operational use as a modular data center (MDC), the ECS managed by an ECS controller positioned in at least one of the ITPAC module and the ES module, the ECS controller responsive to sensor inputs to determine environmental requirements of the ITPAC module to select an environmental operating mode of the ES module;
a communication test cable connectable between the ITPAC module and the ES module to carry sensor and control signals for operation of the ECS;
a test controller communicatively coupled to the memory and the ECS controller via the communication test cable to a selected module from among the ITPAC module and the ES module, the test controller substituting for the unselected module that is not being tested, the test controller executing the test application which, in response to a trigger to test the selected module, enables the test controller to:
determine one or more functional tests that are specified for the selected module; and
for each of the one or more functional tests:
identify at least one input signal value that originate from the unselected module that the test controller has to emulate;
emulate, via the communication test cable, the identified at least one input signal value;
detect, via the communication test cable, any response by the selected module to the at least one input signal value;
compare the detected response to an expected response contained in the test application; and
generate and output test data based on the comparison.

2. The IHS of claim 1, further comprising a network interface controller that is communicatively coupled to the test controller and that is connected to a network, wherein the test controller enables the IHS to transmit, via the network interface controller, the test data to a remote storage device that is connected to the network.

3. The IHS of claim 1, wherein:
the selected module is the ES module; and
the test application enables the test controller to:
determine the one or more functional tests based on two or more environmental operating modes of the ES module that are defined by a range of values of one or more environmental sensors, the operating modes comprising two or more of: (i) open; (ii) closed; (iii) mixed; (iv) dehumidified; (v) heated; and (vi) cooled;
identify the at least one input value based on identifying values of the one or more environmental sensors that correspond to each one of the two or more environmental operating modes;
sequentially emulate the one or more environmental sensors of the ITPAC module that correspond to each one of the two or more environmental operating modes;
determine the response by the ES module comprising a current environmental operating mode; and
compare the current environmental operating mode to the environmental operating mode associated with the identified values of the one or more environmental sensors.

4. The IHS of claim 1, wherein the ES module comprises an air handling unit (AHU) that is connected to the communication test cable, the ES module further comprising a direct evaporative cooling (DEC) module that is connected to the AHU by a second communication test cable.

5. The IHS of claim 1, wherein:
the selected module is the ITPAC module; and
the test application enables the test controller to:
determine the one or more functional tests based on two or more computing operating modes of the ITPAC module from among: (i) shutdown; (ii) power capped; and (iii) normal, the operating mode corresponding with an environmental operating status of the ES module comprising one or more of: (i) failed off; (ii) failed open; and (iii) normal;
sequentially emulate the environmental operating status of the ES module; and
compare a current operating mode of the ITPAC module with an expected operating mode based on the environmental operating status of the ES module.

6. The IHS of claim 1, wherein the communication test cable connectable between the ITPAC module and the ES module comprises a plug and play connector that reduces functional testing and installation time for the MDC versus a time required to use electrician installed electrical boxes.

7. A method for functionally testing components of modular data centers that are being manufactured, the method comprising:
determining one or more functional tests for quality assurance of an environmental control system (ECS) that are specified for a selected module from among an information technology pre-assembled component (ITPAC) module and an environmental system (ES) module that are configured for being coupled together for cooling of heat-generating equipment of the ITPAC module at a deployed location for operational use as a modular data center (MDC); and
for each of the one or more functional tests:
identifying, by a test controller, at least one input signal value associated with the unselected module;
emulating, via a communication test cable connected between the selected module and the test controller, the identified at least one input signal value;
determining, via the communication test cable, any response by the selected module to the at least one input signal value;
comparing the determined response to an expected response contained in the test application; and
generating and outputting test data based on the comparison.

8. The method of claim 7, further comprising transmitting, via a network interface by the test controller of the IHS, the test data to a remote storage device that is connected to a network.

9. The method of claim 7, further comprising:
determining that the selected module is the ES module;
determining the one or more functional tests based on two or more environmental operating modes of the ES module that are defined by a range of values of one or more environmental sensors, the environmental operating modes comprising two or more of: (i) open; (ii) closed; (iii) mixed; (iv) dehumidified; (v) heated; and (vi) cooled;
identifying the at least one input signal value based on identifying values of the one or more environmental sensors that correspond to each one of the two or more environmental operating modes;
sequentially emulating the one or more environmental sensors of the ITPAC module that correspond to each one of the two or more environmental operating modes;
determining the response by the ES module comprising a current environmental operating mode; and
comparing the current environmental operating mode to the environmental operating mode associated with the identified values of the one or more environmental sensors.

10. The method of claim 7, further comprising determining the one or more functional tests based on two or more environmental operating modes of the ES module that comprises an air handling unit (AHU) that is connected to the communication test cable and a direct evaporative cooling (DEC) module that is connected to the AHU by a second communication test cable.

11. The method of claim 7, further comprising:
determining that the selected module is the ITPAC module;
determining the one or more functional tests based on two or more computing operating modes of the ITPAC module from among: (i) shutdown; (ii) power capped; and (iii) normal, the operating mode corresponding with an environmental operating status of the ES module comprising one or more of: (i) failed off; (ii) failed open; and (iii) normal;
sequentially emulating the environmental operating status of the ES module; and
comparing a current operating mode of the ITPAC module with an expected operating mode based on the environmental operating status of the ES module.

12. The method of claim 7, further comprising establishing communication with the selected module via a communication test cable that is connectable between the ITPAC module and the ES module and which comprises a plug and play connector that reduces functional testing and installation time for the MDC versus a time required to use electrician installed electrical boxes.

13. A method for testing and separately deploying components of a modular data center (MDC), the method comprising:
providing a volumetric container of an information technology pre-assembled component (ITPAC) module that has mounting provisions for heat-generating equipment that require cooling by an environmental system (ES) module that is physically and electrically coupled to the ITPAC module at a deployed location;
installing a portion of an environmental control system (ECS) in the ITPAC module that provides the cooling for the heat-generating equipment and is managed by an ECS controller positioned in at least one of the ITPAC module and the ES module and responsive to sensor inputs to determine environmental requirements of the ITPAC module to select an environmental operating mode of the ES module;
providing a communication test cable configured to carry sensor and control signals for operation of the ECS distributed between the ITPAC module and the ES module;
determining, by a test controller, one or more functional tests for quality assurance of the ECS that are specified for the ITPAC module; and
for each of the one or more functional tests:
identifying, by the test controller, at least one input signal value associated with the ES module;
emulating, via the communication test cable connected between the portion of the ECS installed in the ITPAC module and the test controller, the identified at least one input signal value;
determining, via the communication test cable, any response by the ITPAC module to the at least one input signal value;
comparing the determined response to an expected response contained in a test application; and
generating and outputting test data based on the comparison.

14. The method of claim 13, further comprising transmitting, via a network interface by the test controller of the IHS, the test data to a remote storage device that is connected to a network.

15. The method of claim 13, further comprising:
determining the one or more functional tests based on two or more computing operating modes of the ITPAC module from among: (i) shutdown; (ii) power capped; and (iii) normal, the operating mode corresponding with an environmental operating status of the ES module comprising one or more of: (i) failed off; (ii) failed open; and (iii) normal;
sequentially emulating the environmental operating status of the ES module; and
comparing a current operating mode of the ITPAC module with an expected operating mode based on the environmental operating status of the ES module.

16. The method of claim 13, further comprising:
providing a volumetric container of the ES module;
installing another portion of the ECS in the ES module;
connecting the communication test cable between the portion of the ECS in the ES module and the test controller;
determining, by the test controller, the one or more functional tests based on two or more environmental operating modes of the ES module that are defined by a range of values of one or more environmental sensors, the environmental operating modes comprising two or more of: (i) open; (ii) closed; (iii) mixed; (iv) dehumidified; (v) heated; and (vi) cooled;
identifying the at least one input signal value based on identifying values of the one or more environmental sensors that correspond to each one of the two or more environmental operating modes;
sequentially emulating the one or more environmental sensors of the ITPAC module that correspond to each one of the two or more environmental operating modes;
determining the response by the ES module comprising a current environmental operating mode; and comparing the current environmental operating mode to the environmental operating mode associated with the identified values of the one or more environmental sensors.

17. The method of claim 16, further comprising determining the one or more functional tests based on two or more environmental operating modes of the ES module that comprises an air handling unit (AHU) that is connected to the communication test cable and a direct evaporative cooling (DEC) module that is connected to the AHU by a second communication test cable.

18. The method of claim 16, further comprising providing the communication test cable having plug and play connectors that reduce functional testing and installation time for the MDC versus a time required to use electrician installed electrical boxes.

19. The method of claim 16, further comprising:
in response to completing functional testing of the ITPAC module:
installing the heat-generating equipment by mounting rack information handling systems in the volumetric container of the ITPAC module; and
transporting the ITPAC module to the deployed location; and
in response to completing functional testing of the ES module:
transporting the ES module to the deployed location;
physically coupling the ITPAC module to the ES module; and
electrically coupling respective portions of the ECS in the ITPAC module and ES module with a communication cable that is shorter than the test communication cable and comprises plug and play connectors that reduce functional testing and installation time for the MDC versus a time required to use electrician installed electrical boxes.

\* \* \* \* \*